(12) United States Patent
Nuryaningsih et al.

(10) Patent No.: US 10,385,657 B2
(45) Date of Patent: Aug. 20, 2019

(54) ELECTROMAGNETIC WELL BORE ROBOT CONVEYANCE SYSTEM

(71) Applicant: General Electric Company, Schenectady, NY (US)

(72) Inventors: Lily Nuryaningsih, Edmond, OK (US); Dustin Michael Sharber, Oklahoma City, OK (US); Mahendra Ladharam Joshi, Katy, TX (US); Qi Xuele, Edmond, OK (US); Jeffrey Robert Potts, Oklahoma City, OK (US); Matthew Landon George, Oklahoma City, OK (US)

(73) Assignee: General Electric Company, Schenectady, NY (US)

( * ) Notice: Subject to any disclaimer, the term of this patent is extended or adjusted under 35 U.S.C. 154(b) by 226 days.

(21) Appl. No.: 15/251,838

(22) Filed: Aug. 30, 2016

(65) Prior Publication Data
US 2018/0058179 A1 Mar. 1, 2018

(51) Int. Cl.
*E21B 41/00* (2006.01)
*E21B 23/14* (2006.01)
(Continued)

(52) U.S. Cl.
CPC ............... *E21B 41/00* (2013.01); *B25J 5/02* (2013.01); *B25J 9/12* (2013.01); *B61B 13/00* (2013.01);
(Continued)

(58) Field of Classification Search
CPC .......... E21B 41/00; E21B 47/00; E21B 47/01; E21B 47/06; E21B 23/14; E21B 17/028; E21B 17/046; B25J 5/02; B25J 9/12; B61B 13/00; Y10S 901/01; Y10S 901/19; F16L 2101/00; F16L 2101/30; F16L 55/48;
(Continued)

(56) References Cited

U.S. PATENT DOCUMENTS

| 5,392,715 A | 2/1995 | Pelrine |
| 6,273,189 B1 | 8/2001 | Gissler et al. |

(Continued)

FOREIGN PATENT DOCUMENTS

| AU | 2004216638 B2 | 3/2010 |
| AU | 2012370307 B2 | 2/2015 |

(Continued)

OTHER PUBLICATIONS

Schwanitz et al., "The Development of Wireline-Tractor Technology", Tech 101, vol. 5, No. 2, 2009.
(Continued)

*Primary Examiner* — George S Gray
(74) *Attorney, Agent, or Firm* — Baker Hughes Patent Oganization

(57) ABSTRACT

A well bore robot is configured to travel along an magnetic track element. The magnetic track element includes a plurality of track magnets. The well bore robot includes a robot body and at least one robot magnet. The robot magnet is disposed within the robot body and configured to magnetically and alternatingly engage and disengage with the track magnets. Alternating engagement and disengagement of the robot magnet with the track magnets conveys the well bore robot along the magnetic track element.

12 Claims, 13 Drawing Sheets

(51) Int. Cl.
*E21B 47/00* (2012.01)
*B25J 5/02* (2006.01)
*B25J 9/12* (2006.01)
*B61B 13/00* (2006.01)
*E21B 47/01* (2012.01)
*F16L 55/30* (2006.01)
*F16L 101/30* (2006.01)

(52) U.S. Cl.
CPC .............. *E21B 23/14* (2013.01); *E21B 47/00* (2013.01); *E21B 47/01* (2013.01); *F16L 55/30* (2013.01); *F16L 2101/30* (2013.01); *Y10S 901/01* (2013.01); *Y10S 901/19* (2013.01)

(58) Field of Classification Search
CPC ........... F16L 55/30; B60L 13/00–13/10; B60L 2200/26; E01B 25/30–25/34; G01N 35/04
See application file for complete search history.

(56) References Cited

U.S. PATENT DOCUMENTS

| | | | |
|---|---|---|---|
| 6,378,627 | B1 | 4/2002 | Tubel et al. |
| 6,405,798 | B1 | 6/2002 | Barrett et al. |
| 6,843,317 | B2 | 1/2005 | Mackenzie |
| 7,185,714 | B2 | 3/2007 | Doering et al. |
| 7,322,416 | B2 | 1/2008 | Burris, II et al. |
| 7,675,253 | B2 | 3/2010 | Dorel |
| 7,854,258 | B2 | 12/2010 | Sheiretov et al. |
| 7,857,065 | B2 | 12/2010 | Hansen |
| 7,954,563 | B2 | 6/2011 | Mock et al. |
| 8,028,766 | B2 | 10/2011 | Moore |
| 8,245,796 | B2 | 8/2012 | Mock et al. |
| 8,302,679 | B2 | 11/2012 | Mock |
| 8,485,278 | B2 | 7/2013 | Mock |
| 8,602,115 | B2 | 12/2013 | Aguirre et al. |
| 8,770,303 | B2 | 7/2014 | Aguirre et al. |
| 8,910,720 | B2 | 12/2014 | Aguirre et al. |
| 9,080,388 | B2 | 7/2015 | Heijnen et al. |
| 9,097,086 | B2 | 8/2015 | Aldossary |
| 9,115,793 | B2 | 8/2015 | Nelson et al. |
| 9,133,673 | B2 | 9/2015 | Hill et al. |
| 9,157,287 | B2 | 10/2015 | Slocum et al. |
| 9,169,634 | B2 | 10/2015 | Guerrero et al. |
| 9,228,403 | B1 | 1/2016 | Bloom et al. |
| 9,359,841 | B2 | 6/2016 | Hall |
| 2002/0096322 | A1* | 7/2002 | Barrett .................. E21B 17/028 166/250.01 |
| 2009/0114114 | A1* | 5/2009 | Rose ........................ A63G 7/00 104/53 |
| 2010/0236445 | A1* | 9/2010 | King .................... B60L 13/003 104/130.03 |
| 2010/0242585 | A1 | 9/2010 | Pratyush et al. |
| 2013/0240197 | A1 | 9/2013 | Hallundbaek et al. |
| 2014/0116729 | A1 | 5/2014 | Al-Mulhem |
| 2014/0131045 | A1 | 5/2014 | Loiseau et al. |
| 2015/0218900 | A1 | 8/2015 | Hallundbaek et al. |
| 2015/0251316 | A1 | 9/2015 | Smith |
| 2015/0354301 | A1 | 12/2015 | Dabbous |
| 2015/0355211 | A1* | 12/2015 | Mellars .................. G01N 35/04 436/47 |

FOREIGN PATENT DOCUMENTS

| | | |
|---|---|---|
| AU | 2010298356 B2 | 12/2015 |
| CA | 2582909 C | 5/2011 |
| CA | 2686627 C | 2/2014 |
| CA | 2758788 C | 11/2015 |
| CN | 101338653 A | 1/2009 |
| CN | 100540945 C | 9/2009 |
| CN | 102206992 B | 10/2013 |
| GB | 1428297 A | 3/1976 |
| GB | 2434819 B | 11/2008 |
| GB | 2522880 A | 8/2015 |
| MX | 2014015154 A | 8/2015 |
| RU | 2487230 C2 | 7/2013 |
| WO | 2013063317 A3 | 2/2014 |
| WO | 2014128262 A1 | 8/2014 |
| WO | 2015047399 A1 | 4/2015 |
| WO | 2015073823 A3 | 8/2015 |

OTHER PUBLICATIONS

K Mody et al., "Oilfield Automation", Pumps and Pipes, Proceedings of the Annual Conference, pp. 9-20, Oct. 20, 2010.

Kim, "Sensor-Based Autonomous Pipeline Monitoring Robotic System", Louisiana State University, Dec. 2011.

Liu et al., "Down-hole robots: Current status, challenge and innovation", 2013 IEEE International Conference on Mechatronics and Automation, pp. 1703-1707, Aug. 4-7, 2013, Takamatsu.

Peoples et al., "Electric Line Tractor-Based Conveyance in High Temperature Wells: A Collection of Local Case Stories", SPE/ICoTA Coiled Tubing and Well Intervention Conference and Exhibition, pp. 09, Mar. 25-26, 2014, The Woodlands, Texas, USA.

R Loov et al., "Beyond Logging: Slickline Operations Can Now Provide a More Efficient and Cost Effective Alternative to Traditional Intervention Operations", SPE/ICoTA Coiled Tubing and Well Intervention Conference and Exhibition, pp. 08, Mar. 25-26, 2014, The Woodlands, Texas, USA.

Lahkar et al., "Robotic Logging Technology: The Future of Oil Well Logging", Journal of Geology & Geophysics, vol. 3:166, Jul. 7, 2014.

* cited by examiner

US 10,385,657 B2

ELECTROMAGNETIC WELL BORE ROBOT CONVEYANCE SYSTEM

BACKGROUND

The field of the invention relates generally to oil and gas well intervention systems and, more specifically, to an electromagnetic well bore conveyance system.

At least some known oil and gas wells require periodic well intervention procedures. These well intervention procedures may include well integrity inspections or equipment retrieval. At least some known well intervention systems include wireline systems and coiled tubing systems. Wireline systems lower repair equipment and inspection equipment down a well with a cable or wire. Coiled tubing systems lower repair equipment and inspection equipment down a well with a jointless pipe. Both wireline and coiled tubing systems require a substantial cost and a substantial amount of well downtime.

BRIEF DESCRIPTION

In one aspect, a well bore robot is provided. The well bore robot is configured to travel along a magnetic track element. The magnetic track element includes a plurality of track magnets. The well bore robot includes a robot body and at least one robot magnet. The robot magnet is disposed within the robot body and configured to magnetically and alternatingly engage and disengage with the track magnets. Alternating engagement and disengagement of the robot magnet with the track magnets conveys the well bore robot along the magnetic track element.

In a further aspect, a well bore robot conveyance system is provided. The well bore robot conveyance system includes a magnetic track element and a well bore robot. The magnetic track element includes a plurality of track magnets. The well bore robot includes a robot body and at least one robot magnet. The robot magnet is disposed within the robot body and configured to magnetically and alternatingly engage and disengage with the track magnets. Alternating engagement and disengagement of the robot magnet with the track magnets conveys the well bore robot along the magnetic track element.

In another aspect, a measurement system in a cavity is provided. The measurement system includes an magnetic track element and a robot. The magnetic track element includes a plurality of track magnets. The robot is configured to travel along the magnetic track element. The robot includes a robot body, at least one data collection and data transfer module, and at least one robot magnet, at least one power storage unit, and electronic control board. The data collection module is disposed within the robot body and is configured to collect data. The robot magnet is disposed within the robot body and is configured to magnetically and alternatingly engage and disengage with the track magnets. Alternating engagement and disengagement of the robot magnet with the track magnets conveys the robot along the magnetic track element.

DRAWINGS

These and other features, aspects, and advantages of the present disclosure will become better understood when the following detailed description is read with reference to the accompanying drawings in which like characters represent like parts throughout the drawings, wherein.

Figure 1:
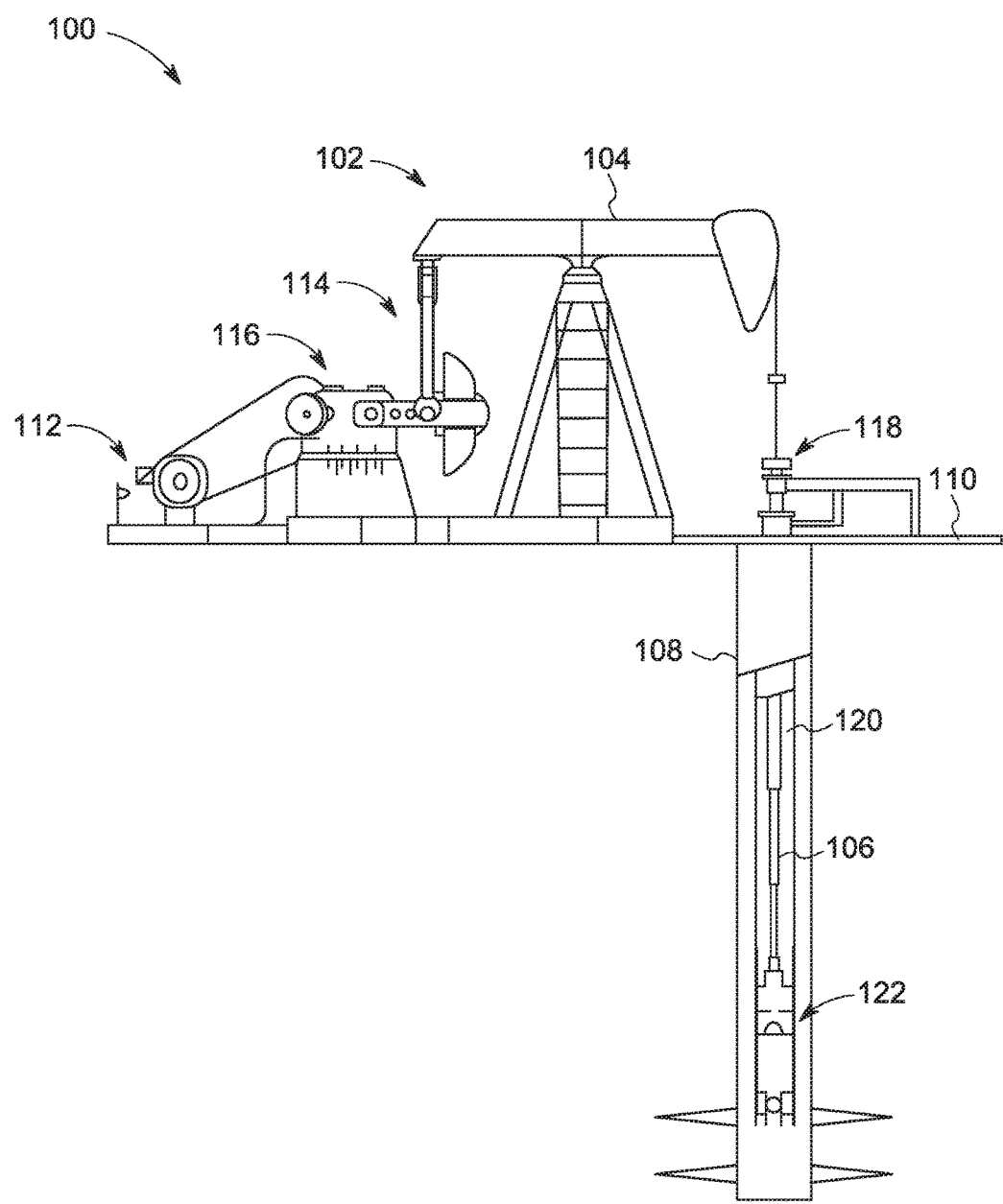
FIG. 1 is a schematic view of an exemplary rod pump system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer", and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The magnetic well bore robot conveyance systems described herein facilitate a faster and more cost effective method of intervening in an oil and gas well. The magnetic well bore robot conveyance system includes a magnetic robot device and a magnetic track element configured to convey the robot device down an oil and gas well. The track element includes a plurality of magnets, either permanent or electromagnetic or both in combination, along the length of a wire which create a magnetic field in front of and behind the robot device. The robot device includes at least one magnet, either permanent or electromagnetic, which interacts with the magnetic field of the track element. The magnetic track element conveys and controls the descent of the robot device down an oil and gas well by controlling magnetic polarity (south/north or negative/positive) by alternating the direction of current flow through the electromagnets within the magnetic track element. The magnet within the robot body is oriented in such a way relative to the magnetic track element as to generate a thrust force from the interaction between the magnetic fields of the magnet within the robot body and the magnetic track element. Alternating the polarities of the electromagnets on the magnetic track element causes the magnetic field in front of the robot device to move the robot forward, while the magnetic field behind the robot device adds more forward thrust, enabling conveyance of the robot over long distances. Sending equipment down an oil and gas well with a magnetic track completes well intervention in less time than conventional inspection methods, reduces down time due to inspections, and reduces inspection costs.

FIG. 1 is a schematic view of an exemplary rod pump system 100. In the exemplary embodiment, pump system 100 includes a beam pump 102 with a beam 104 coupled to a polished rod string 106 adjacent a well bore 108. Well bore 108 is drilled through a surface 110 to facilitate the extraction of production fluids including, but not limited to, petroleum fluids and water, with and without hard particles. As used herein, petroleum fluids refer to mineral hydrocarbon substances such as crude oil, gas, and combinations thereof.

Beam pump 102 is actuated by a prime mover 112, such as an electric motor, coupled to a crank arm 114 through a gear reducer 116, such as a gear box. Gear reducer 116 converts torque produced by prime mover 112 to a low speed but high torque output suitable for driving the pumping oscillation of crank arm 114. Crank arm 114 is coupled to beam 104 such that rod string 106 reciprocates within well bore 108 during operation. In alternative embodiments, beam pump 102 is any suitable pump that facilitates reciprocating rod string 106 as described herein. Pump system 100 further includes a well head 118, production tubing 120 coupled to well head 118, and a downhole pump 122 disposed at the bottom of well bore 108. Rod string 106 is coupled to downhole pump 122 such that production fluids are lifted towards surface 110 upon each upswing of rod string 106. Well bore 108 requires periodic well intervention procedures. These well intervention procedures may include well integrity inspections or equipment retrieval, monitoring, reporting and triggering downhole functions, measuring downhole pressure and temperature gradients, sensing and releasing packer fluids downhole and reporting to surface, resetting packers, controlling pressure, determining flow rate, evaluating composition of fracturing fluid downhole, controlling inflow control devices, dispensing chemicals or water to aid in downhole cementing operations, equipment retrieval, casing repair, well bore or perforation cleaning and clearing, casing collar locating, tool conveyance, activating port collars, activating stage cementing equipment, shifting downhole sliding sleeves, cement bond logging, or casing caliper logging.

Figure 2:
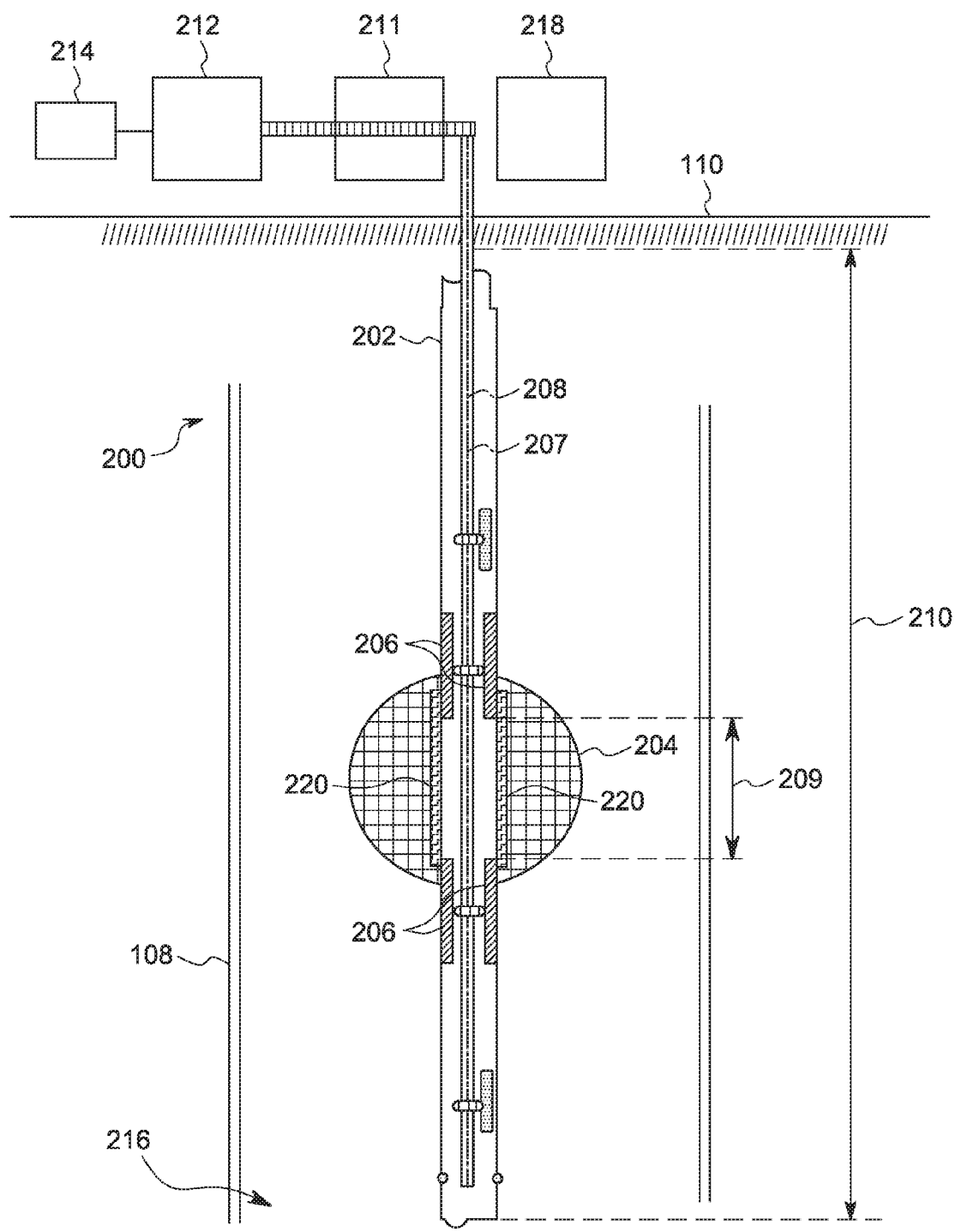
FIG. 2 is a schematic view of well bore robot conveyance system within a well bore shown in FIG. 1.

FIG. 2 is a schematic view of well bore robot conveyance system 200 which performs well integrity inspections or equipment retrieval procedures on well bore 108. Well bore robot conveyance system 200 includes an electromagnetic (EM) track element 202 and a well bore robot 204. EM track element 202 is configured to convey well bore robot 204 up and down well bore 108. EM track element 202 includes electrically conductive wire/ribbon/cable material, similar to cables used for artificial lift equipment. Base material of EM track element 202 is an electrically-insulating material capable of withstanding the high temperature fluid environment within the well bore, including polymeric materials and composites thereof. Examples include but are not limited to epoxies, poly(etheretherketone) (PEEK), acetal resins (e.g., polyoxymethylene), poly(tetra fluoroethylene)

(PTFE), nitrile rubber (NBR), hydrogenated nitrile rubber (HNBR), fluoroelastomers, perfluoroeleastomers, and polysiloxanes such as polydimethylsiloxane (PDMS). Reinforcing fillers for these polymeric materials useful for this application include but are not limited to glass fibers, carbon fibers, carbon black, silica, alumina, and nanomaterials such as nano-silica, carbon nanotubes, graphene, and hexagonal boron nitride. EM track element 202 further includes a plurality of electromagnets 206, at least one data transfer line 207, and at least one power line 208. Electromagnets 206 are positioned periodically along a length 210 of EM track element 202 at pre-determined distances 209. In the exemplary embodiment, distance 209 is about 1 centimeter (cm) (0.39 inches) to about 1 meter (m) (39.4 inches). However, distance 209 may be any length which enables well bore robot conveyance system 200 to operate as described herein. Power line 208 is electrically coupled to electromagnets 206.

A motorized EM track spool 212 deploys and retracts EM track element 202. EM track element 202 and well bore robot 204 are deployed into well bore 108 through a launching station 211 positioned upstream of a choke valve (not shown). EM track element 202 may be temporarily installed in well bore 108 or may be permanently installed in well bore 108.

A power source 214 is electrically coupled to power line 208. Power source 214, power line 208, and data transfer line 207 transmit electrical power and control signals in the form of timed-electrical pulses to energize and de-energize electromagnets 206. The voltage of the timed electrical pulses is about 110 volts (V) to about 10 kilovolts (kV). However, the voltage of the timed electrical pulses may be any voltage which enables well bore robot conveyance system 200 to operate as described herein. The electric current of the timed electrical pulses is about 5 amperes (A) to about 50 A. However, the electric current of the timed electrical pulses may be any electric current which enables well bore robot conveyance system 200 to operate as described herein. The frequency of the timed electrical pulses is about 60 hertz (Hz) to about 1 megahertz (MHz). However, the frequency of the timed electrical pulses may be any frequency which enables well bore robot conveyance system 200 to operate as described herein. The signals are transmitted from surface 110 to the total depth (TD) 216 of well bore 108. Additionally, the signals are transmitted from TD 216 of well bore 108 to surface 110. Thus signals may be transmitted bi-directionally along EM track element 202 at certain pulse frequencies. A computer 218 on surface 108 controls power source 214, power line 208 and data transfer line 207. Computer 218 may be wirelessly coupled to EM track element 202 and power source 214 or may be coupled to EM track element 202 and power source 214 by a wire.

Well bore robot 204 includes at least one permanent magnet 220. In the exemplary embodiment, well bore robot 204 includes two permanent magnets 220. However, well bore robot 204 may include any number of permanent magnets 220 which enable well bore robot 204 to operate as described herein. Energizing and de-energizing or reversing the polarity of electromagnets 206 creates a unique magnetic field distribution (not shown) that propel well bore robot 204 along EM track element 202. The electric current supplied to power line 208 and electromagnets 206 is constantly alternating to change the polarity of electromagnets 206. This change in polarity causes the magnetic field in front of well bore robot 204 to pull the well bore robot 204 forward, while the magnetic field behind well bore robot 204 adds more forward thrust. In the exemplary embodiment, the velocity of well bore robot 204 through the well bore is about 100 feet per minute. However, the velocity of well bore robot 204 may be any velocity which enables well bore robot conveyance system 200 to operate as described herein.

Figure 3:
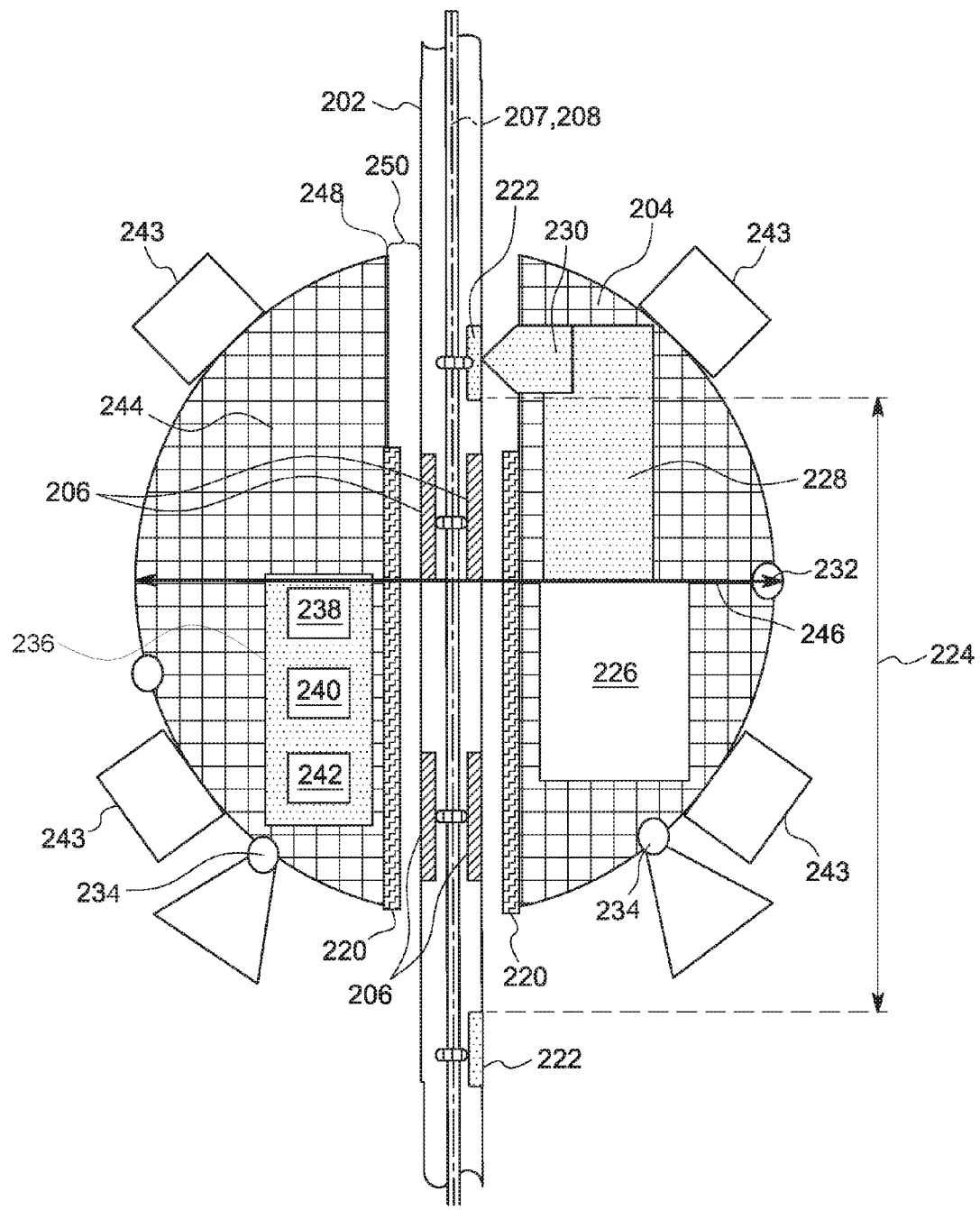
FIG. 3 is a schematic cut-away view of a well bore robot shown in FIG. 2.

FIG. 3 is a schematic cut-away view of well bore robot 204. EM track element 202 further includes at least one data transfer port 222 positioned periodically along length 210 of EM track element 202 at pre-determined distances 224. In the exemplary embodiment, distance 224 is about 5 millimeters (mm) (0.19 inches) to about 1 m (39.4 inches). However, distance 224 may be any length which enables well bore robot conveyance system 200 to operate as described herein. Well bore robot 204 further includes a battery 226, a data storage device 228, a data transfer brush 230, at least one sensor 232, at least one camera 234, and a plurality of control devices 236. Data transfer brush 230 provides electrical contact between the robot and data transfer ports 222 on data transfer line 207. Data transfer brush 230 includes an electrically conductive contact which transfers data to an electrically conductive contact within data transfer ports 222. Control devices 236 include a gyroscope 238, an accelerometer 240, and a control unit 242. Control devices 236 may include any device which enables well bore robot conveyance system 200 to operate as described herein. Sensors 232 include well integrity sensors for well inspections, pressure sensors, temperature sensors, viscosity sensors, accelerometers (1 axis, 2 axes, or 3 axes), conductivity sensors, magnetic permeability sensors, flow rate sensors, density sensors, pH meters, gamma ray detectors, acoustic sensors, x-ray or radiographic inspection equipment, visual and infrared cameras, or image recognition chips. Sensors 232 may include any device which enables well bore robot conveyance system 200 to operate as described herein. Well bore robot 204 also optionally includes a plurality of scrapers or brushes 243 configured to remove or brush away scale deposits, debris or other obstructions within well bore 108.

In the exemplary embodiment, battery 226 provides power to data storage device 228, data transfer brush 230, sensors 232, camera 234, and control devices 236. In another embodiment, well bore robot 204 does not include battery 226. Data storage device 228, data transfer brush 230, sensors 232, camera 234, and control devices 236 all receive power from power line 208. In another embodiment, well bore robot 204 includes battery 226 as an emergency source of power. In this embodiment, data storage device 228, data transfer brush 230, sensors 232, camera 234, and control devices 236 all receive power from power line 208 during normal operations and receive power from battery 226 when power from power line 208 is not available.

Control unit 242 includes a chip, an integrated circuit, or set of electronic circuits for data processing. Control unit 242 is coupled in data transfer communication with data storage device 228, data transfer brush 230, sensors 232, camera 234, and other control devices 236. Accelerometer 240 and gyroscope 238 provide data to control unit 242 to track the location and direction of well bore robot 204. In the exemplary embodiment, control unit 242 receives instructions from computer 218. In another embodiment, control device 236 may be preprogramed and does not receive real-time instructions from computer 218. Based on preprogrammed instructions, control unit 242 controls data storage device 228, data transfer brush 230, sensors 232, camera 234, and other control devices 236 to complete a task such as a casing inspection at a specific location. After well bore robot 204 has completed its task, it returns to surface 110 and the data collected is downloaded from data storage device 228.

Control unit 242 may also include wireless communications capability. Specifically, control unit 242 may also include a router configured to communicate with wireless networks including WLAN, GSM, CDMA, LTE, WiMAX, or any other wireless network. Additionally, control unit 242 may also be configured to send and receive acoustic signals generated by piezoelectric transducers. Control unit 242 may further be configured to send and receive optical signals generated by fiber optic sensors. Control unit 242 may also be configured to send and receive electromagnetic telemetry signals between sensors, transmitters, and receivers. Control unit 242 may further be configured to send and receive Bluetooth signals. Finally, control unit 242 may be configured to wirelessly communicate with other well bore robots 204 within well bore 108.

Data transfer brush 230 and data transfer port 222 include sliding electrical contacts configured to transfer data between them. Data transfer port 222 is coupled in data transfer communication with data transfer line 207 which, in turn, is coupled in data transfer communication with computer 218. Data transfer brush 230 is coupled in data transfer communication with data storage device 228, data transfer brush 230, sensors 232, camera 234, control unit 242, and other control devices 236.

During operation, EM track element 202 conveys well bore robot 204 up and down well bore 108. Sensors 232 and camera 234 collect data on the state of well bore 108. The data collected by sensors 232 and camera 234 is stored on data storage device 228. Data storage device 228 sends data to data transfer brush 230. Data transfer brush 230 transfers data to data transfer port 222 once data transfer brush 230 passes over data transfer port 222. Data transfer port 222 transfers data to computer 218 through data transfer line 207.

The transfer of data may also be reversed. Computer 218 transfers data to data transfer port 222 through data transfer line 207. Data transfer port 222 transfers date to data transfer brush 230 which sends data to data storage device 228, data transfer brush 230, sensors 232, camera 234, control unit 242, and other control devices 236.

In another operational embodiment, control unit 242 is preprogramed to complete a task. Control unit 242 controls data storage device 228, data transfer brush 230, sensors 232, camera 234, and other control devices 236 during this operational embodiment. However, computer 218 still controls the movement of well bore robot 204 by controlling the timed-electrical pulses to energize and de-energize electromagnets 206. Once well bore robot 204 arrives at a predetermined location, control unit 242 commands sensors 232 and camera 234 to collect data. The collected data is stored on data storage device 228. Once well bore robot 204 returns to surface 110, the collected data is retrieved from data storage device 228.

In the exemplary embodiment, well bore robot 204 includes a robot body 244 which includes a spherical shape and includes a diameter 246. Diameter 246 is about 4 inches to about 24 inches. However, diameter 246 may be any value which enables well bore robot conveyance system 200 to operate as described herein. Well bore robot 204 also includes a slot 248 configured to circumscribe EM track element 202. Slot 248 has a similar in size and shape as EM track element 202 with an additional gap clearance 250 around EM track element 202 for smooth frictionless movement. Additional gap clearance 250 has a length of about 0.16 cm (0.0625 inch) to about 0.64 cm (0.25 inch). However, additional gap clearance 250 may be any size which enables well bore robot conveyance system 200 to operate as described herein. Permanent magnets 220 are positioned within slot 248 to engage with electromagnets 206. In the exemplary embodiment, slot 248 runs through the center of well bore robot 204. However, in other embodiments (not shown), slot 248 may run off-center through well bore robot 204.

In another embodiment, robot body 244 defines a cylindrical shape, a capsule shape, a cubical shape, or a conical shape. Robot body 244 may be any shape which enables well bore robot conveyance system 200 to operate as described herein. In the exemplary embodiment, robot body 244 is comprised of a fiber-reinforced plastic or suitable lightweight composite material capable of withstanding the downhole environment. Examples include but are not limited to virgin and reinforced poly(aryletherketones) such as PEEK, poly(etherketoneketone) (PEKK), poly(etherketoneetherketoneketone) (PEKEKK), acetal resins (e.g., polyoxymethylene), poly(phenylenesulfide) (PPS), substituted polyphenylenes, polyphenylsulfones, PTFE, and epoxy materials. In another embodiment, robot body 244 includes light weight dissolvable or electrochemically active materials which can degrade when exposed to hot fresh water, saline produced water, or activation chemicals such as acids or organic solvents. If well bore robot 204 became irretrievable within well bore 108, robot body 244 would dissolve when exposed to hot fresh water, saline produced water, or activation chemicals. Such light weight materials include magnesium alloys which can withstand 1.03 megapascal (MPa) (15,000 pounds per square inch (psi)) hydrostatic pressure. In another embodiment, robot body 244 includes water-dissolvable polymers such as poly(lactic acid) (PLA) and poly(glycolic acid) (PGA) which can withstand 34.5 MPa (5,000 psi) downhole pressure. In another embodiment, robot body 244 includes light weight plastic or composites having sufficient buoyancy to float in the well fluid and rise to the surface if control of well bore robot 204 is lost. Robot body 244 may include any material which enables well bore robot conveyance system 200 to operate as described herein.

Figure 4:
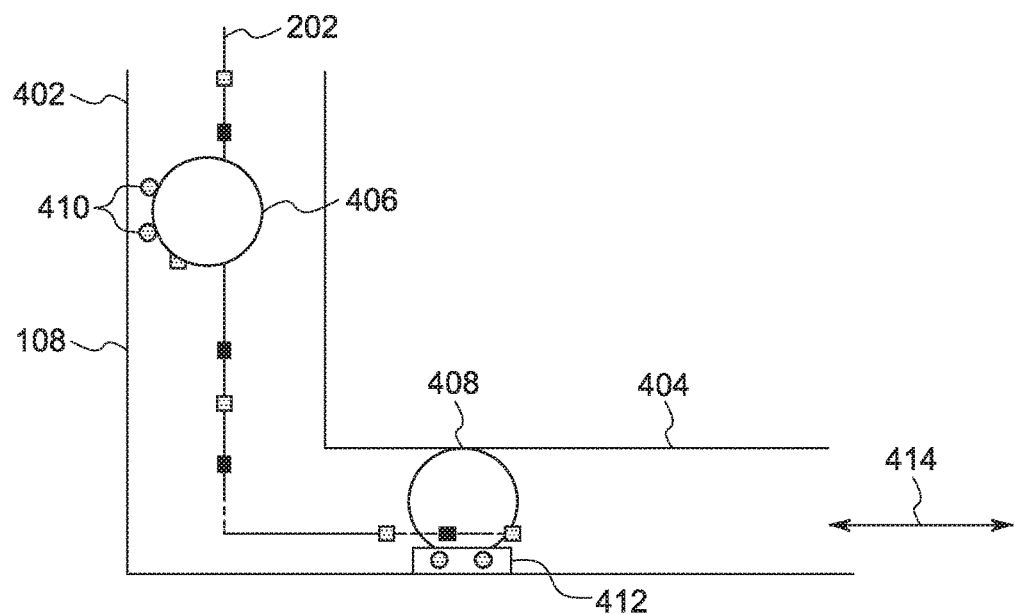
FIG. 4 is a schematic cut-away view of a well bore robot shown in FIG. 1 conveys in horizontal section of a well bore.

FIG. 4 is a schematic cut-away view of well bore 108 with a vertical section 402 and a horizontal section 404. EM track element 202 runs through both vertical section 402 and horizontal section 404. A first well bore robot 406 is positioned within vertical section 402 and a second well bore robot 408 is positioned within horizontal section 404. First well bore robot 406 includes at least one wheel 410 configured to convey first well bore robots 406 along EM track element 202. Wheel 410 assists first well bore robot 406 within vertical section 402 by rolling along the side of well bore 108 reducing the friction against well bore 108. Wheel 410 allows first well bore robot 406 to move in a horizontal direction 414 along horizontal section 404 within well bore 108. Second well bore robot 408 includes track element 412 configured to convey second well bore robots 408 along EM track element 202. Track element 412 assists second well bore robots 408 within vertical section 402 by rolling along the side of well bore 108 reducing the friction against well bore 108. Track element 412 allows second well bore robots 408 to move in horizontal direction 414 along horizontal section 404 within well bore 108.

Figure 5:
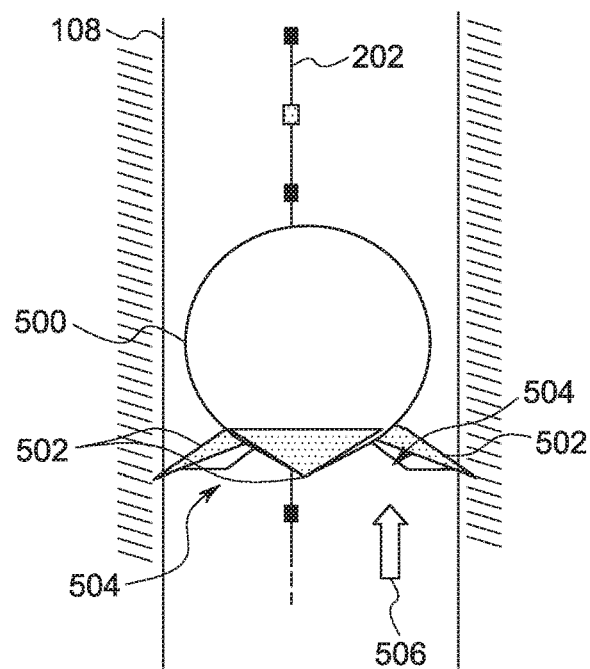
FIG. 5 is a schematic cut-away view of a well bore shown in FIG. 1 could be flow-assisted and launched to surface by retracting flaps.

FIG. 5 is a cut-away schematic view of well bore 108 with a well bore robot 500. Well bore robot 500 includes a plurality of flaps 502 which are stored in a non-deployed configuration (not shown) during normal operations. Flaps 502 are attached to well bore robot 500 and a plurality of gaps 504 are defined between flaps 502. During off-normal operations, such as when well bore robot 500 becomes stuck in well bore 108, well fluids are allowed to flow through well bore 108 in a vertical direction 506. Flaps 502 are deployed into the flow of well fluids to assist with retrieval of well bore robot 500. The well fluids propel well bore robot 500 to surface 110 (shown in FIG. 1). Gaps 504 allow well fluids to flow past well bore robot 500. In the exemplary embodiment, well bore robot 500 includes four flaps 502. However, well bore robot 500 may include any number of flaps 502 which enables well bore robot conveyance system 200 to operate as described herein.

Figure 6:
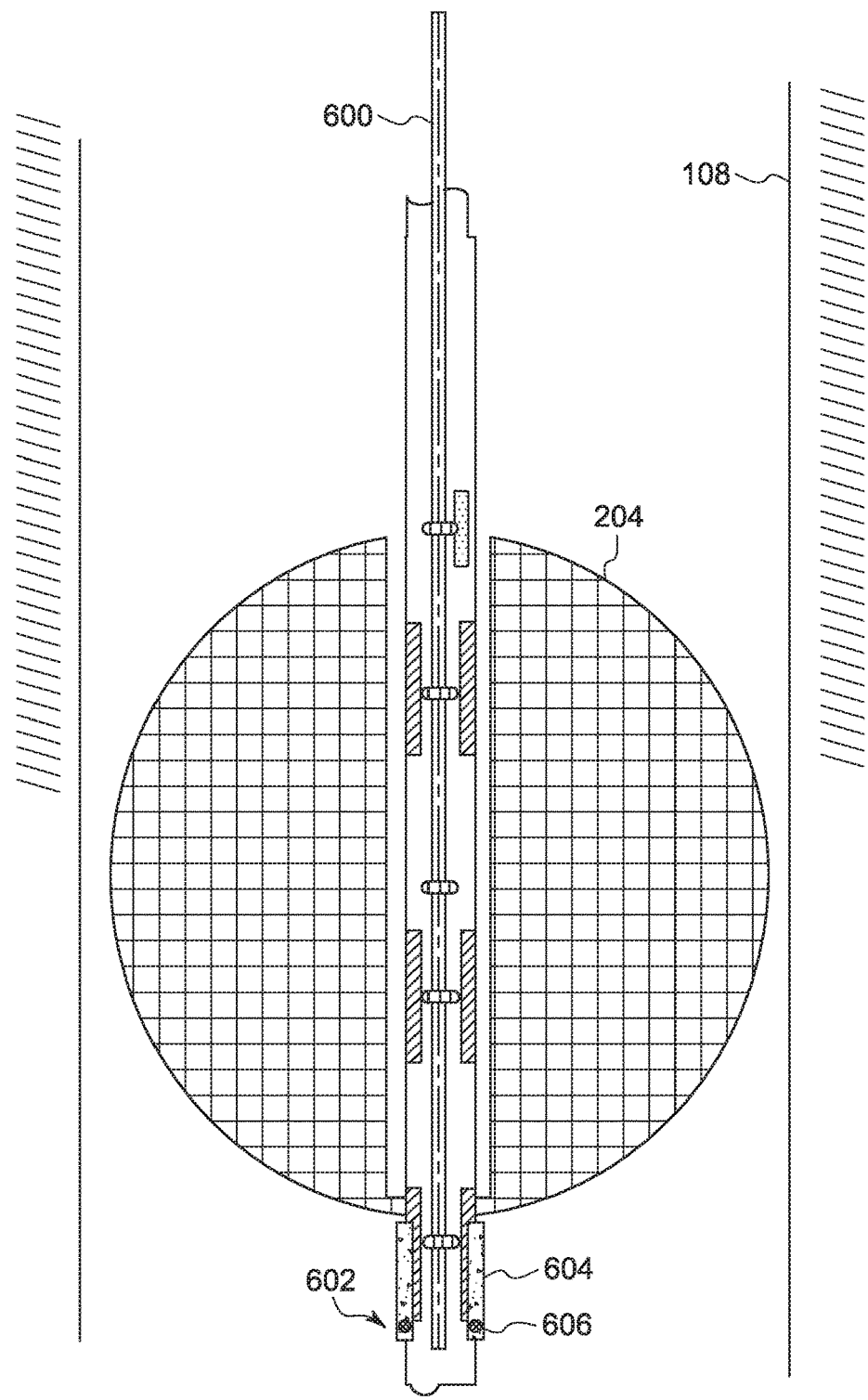
FIG. 6 is a cut-away schematic view of a well bore shown in FIG. 1 with an EM track element with a safety latch in a closed position.
Figure 7:
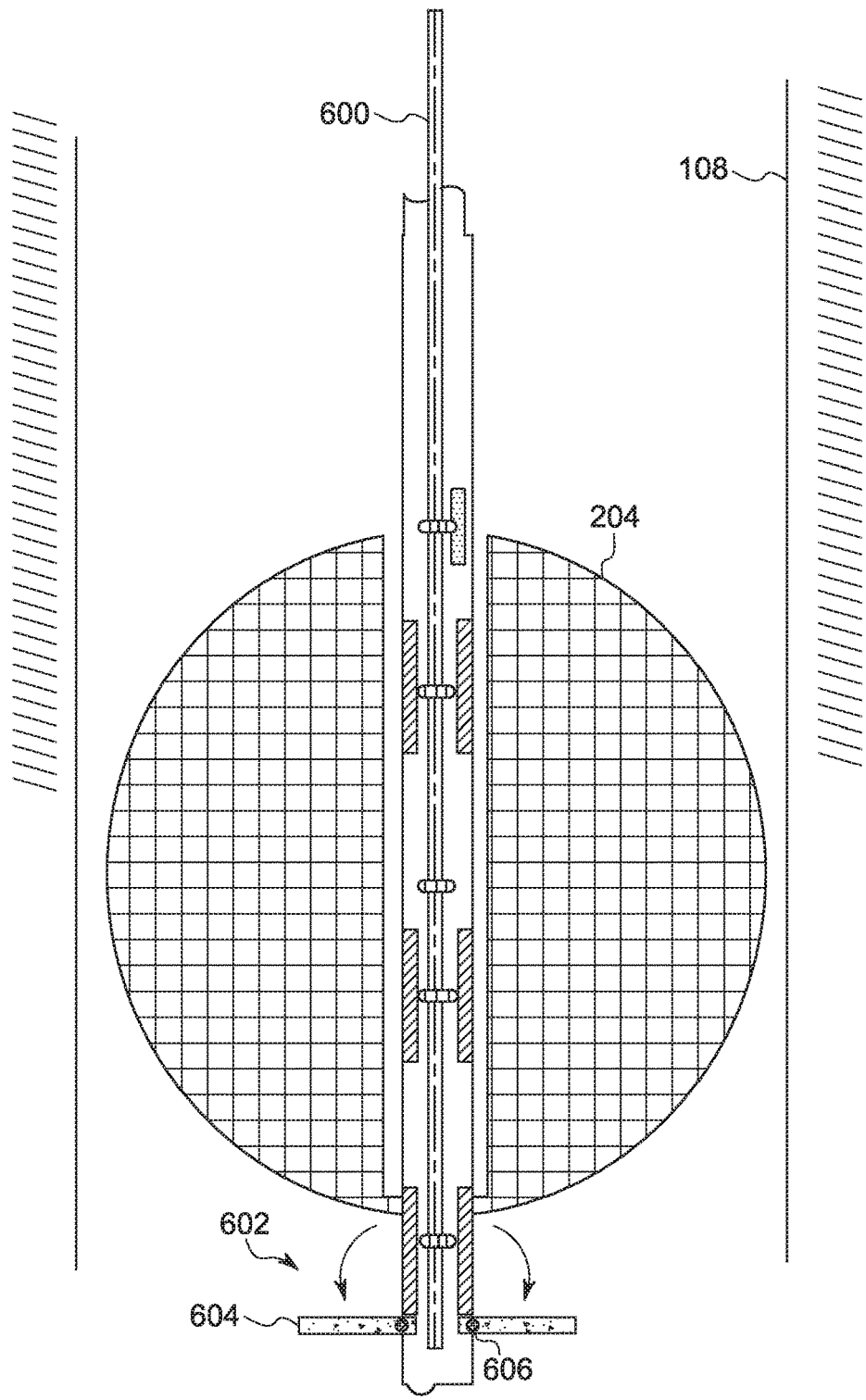
FIG. 7 is a cut-away schematic view of a well bore shown in FIG. 1 with an EM track element with a safety latch in an open position.

FIG. 6 is a cut-away schematic view of well bore 108 with an EM track element 600 with a safety latch 602 in a closed position. FIG. 7 is a cut-away schematic view of well bore 108 with EM track element 600 with safety latch 602 in an open position. Safety latch 602 includes at least one cantilever 604 coupled to EM track element 600 at a pivot point 606. Pivot point 606 allows cantilever 604 to pivot between a closed position and an open position. Cantilever 604 pivots to a closed position during normal operations or when EM track element 600 is coupled to power source 214. Cantilever 604 is parallel to EM track element 600 and allows well bore robot 204 to pass when in a closed position. Cantilever 604 pivots to an open position during off-normal operations or when EM track element 600 is not coupled to power source 214. Cantilever 604 is perpendicular to EM track element 600 and does not allow well bore robot 204 to move when in an open position. Safety latch 602 prevents well bore robot 204 from descending further into well bore 108 when power from power source 214 has been lost. Once safety latch 602 has stopped the descent of well bore robot 204, EM track element 600 is retracted to surface 110 and well bore robot 204 is retrieved. If power is restored to EM track element 600, well bore robot 204 will rise to allow cantilever 604 to pivot into a closed position and well bore robot 204 continues to safely descend past safety latch 602.

Figure 8:
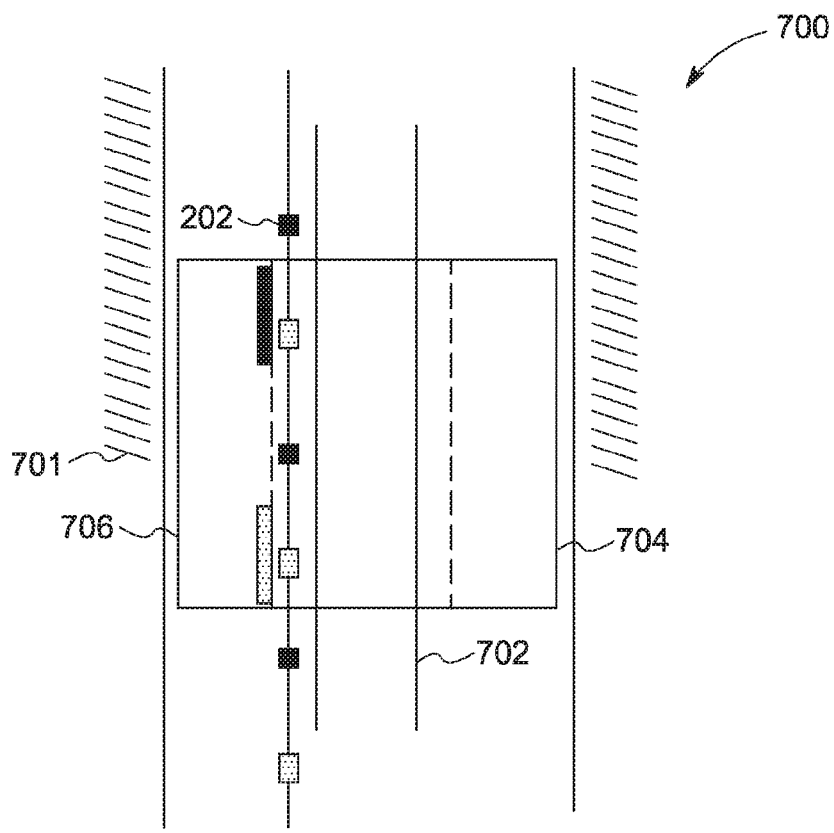
FIG. 8 is a cutaway schematic view of annular well bore robot body in a well bore shown in FIG. 1.
Figure 9:
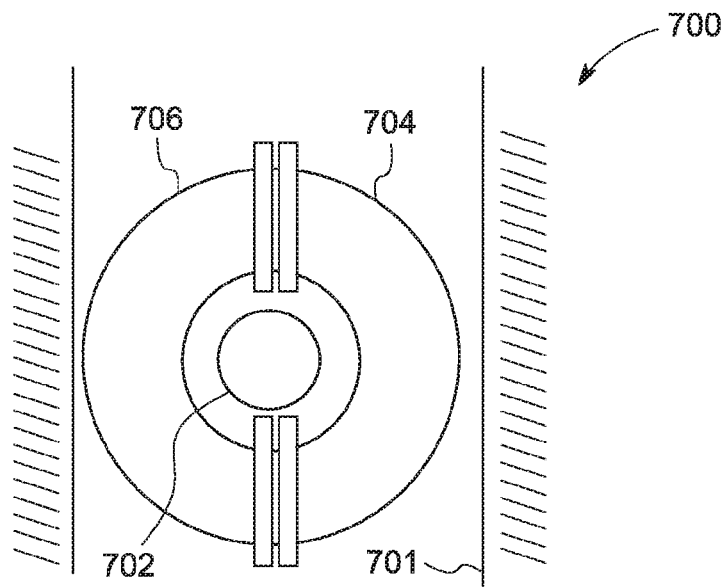
FIG. 9 is a top view of annular well bore robot body in a well bore shown in FIG. 1.
Figure 10:
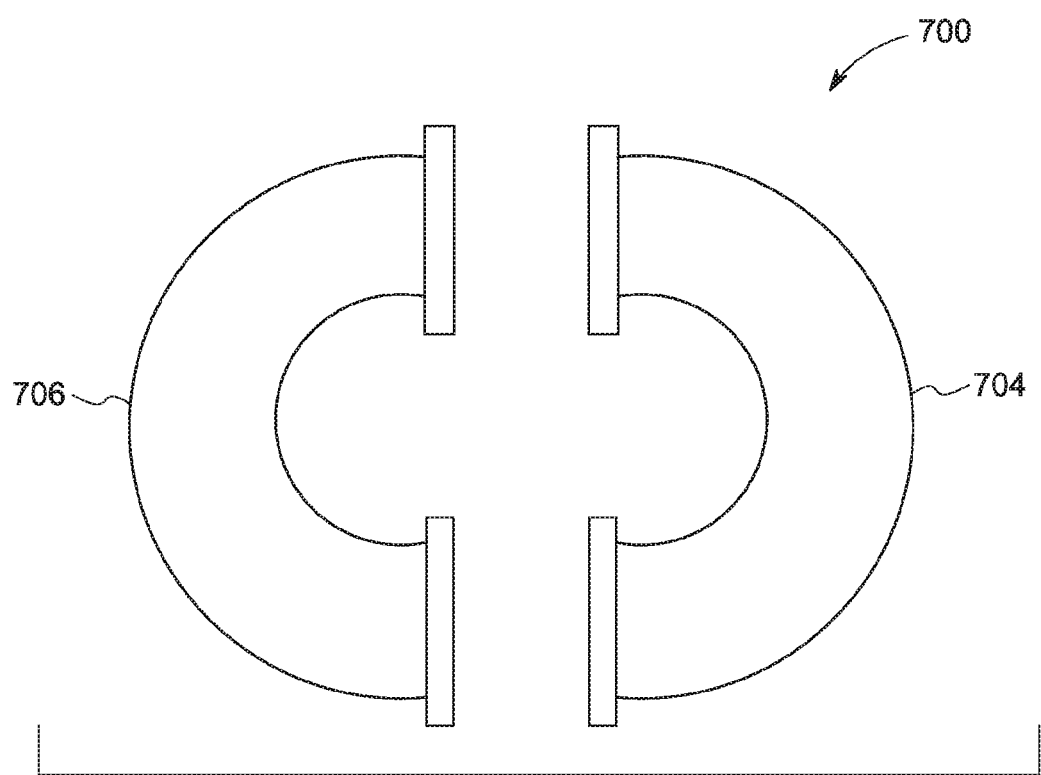
FIG. 10 is a top view of a well bore robot body.

FIG. 8 is a cutaway schematic view of a robot body 700 in a well bore 701. FIG. 9 is a top view of robot body 700 in well bore 701. FIG. 10 is a top view of robot body 700. Well bore 701 includes a production tube 702 positioned within well bore 701 and configured to channel production fluids (oil, water, and gas) to surface 110. Robot body 244 (shown in FIGS. 2-6) is unable to descend well bore 701 because production tube 702 interferes with the descent of the spherically shaped robot body 244. As such, robot body 700 defines a torus shape which circumscribes production tube 702 and allows robot body 700 to descend well bore 701. Robot body 700 includes a first half 704 and a second half 706. First and second halves 704 and 706 are coupled together around production tube 702 at launch station 211. EM track element 202 runs through the center of robot body 700 on one side of production tube 702. Robot body 700 operates in a similar manner as well bore robot 204.

Figure 11:
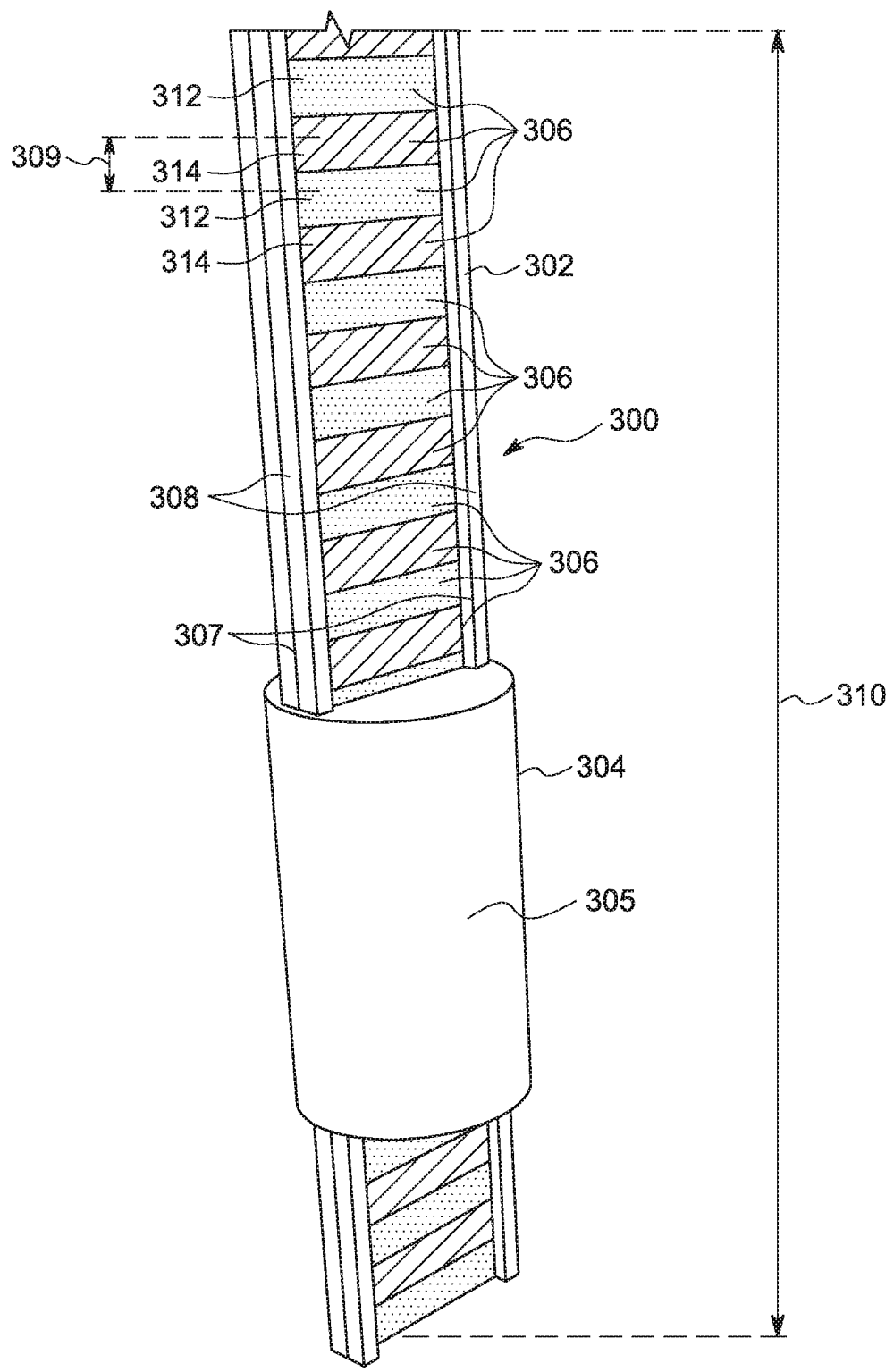
FIG. 11 is a perspective view of a well bore robot conveyance system.

FIG. 11 is a perspective view of well bore robot conveyance system 300 which performs well integrity inspections or equipment retrieval procedures on well bore 108. Well bore robot conveyance system 300 is similar to well bore robot conveyance system 200 except that the well bore robot contains electromagnets while the track consists of permanent magnets distributed along its length. Well bore robot conveyance system 300 includes a magnetic track element 302 and an electromagnetic (EM) well bore robot 304. Magnetic track element 302 is configured to convey EM well bore robot 304 up and down well bore 108. Magnetic track element 302 includes all of the attributes of EM track element 202 except for the arrangement of the magnets described below. Similarly, EM well bore robot 304 includes all of the attributes of well bore robot 204 except for the arrangement of the magnets described below. EM well bore robot 304 includes a shell 305. In the exemplary embodiment, shell 305 defines a cylindrical shape. In another embodiment, shell 305 defines a capsule shape, a cubical shape, or a conical shape. Shell 305 may be any shape which enables well bore robot conveyance system 300 to operate as described herein.

Magnetic track element 302 further includes a plurality of permanent magnets 306, at least one data transfer line 307, and at least one power line 308. Permanent magnets 306 are positioned periodically along a length 310 of magnetic track element 302 at pre-determined distances 309. Each permanent magnet 306 consists of a north pole 312 and south pole 314. Permanent magnets 306 are positioned such that north poles 312 and south poles 314 alternate along the length of the magnetic track element 302.

Figure 12:
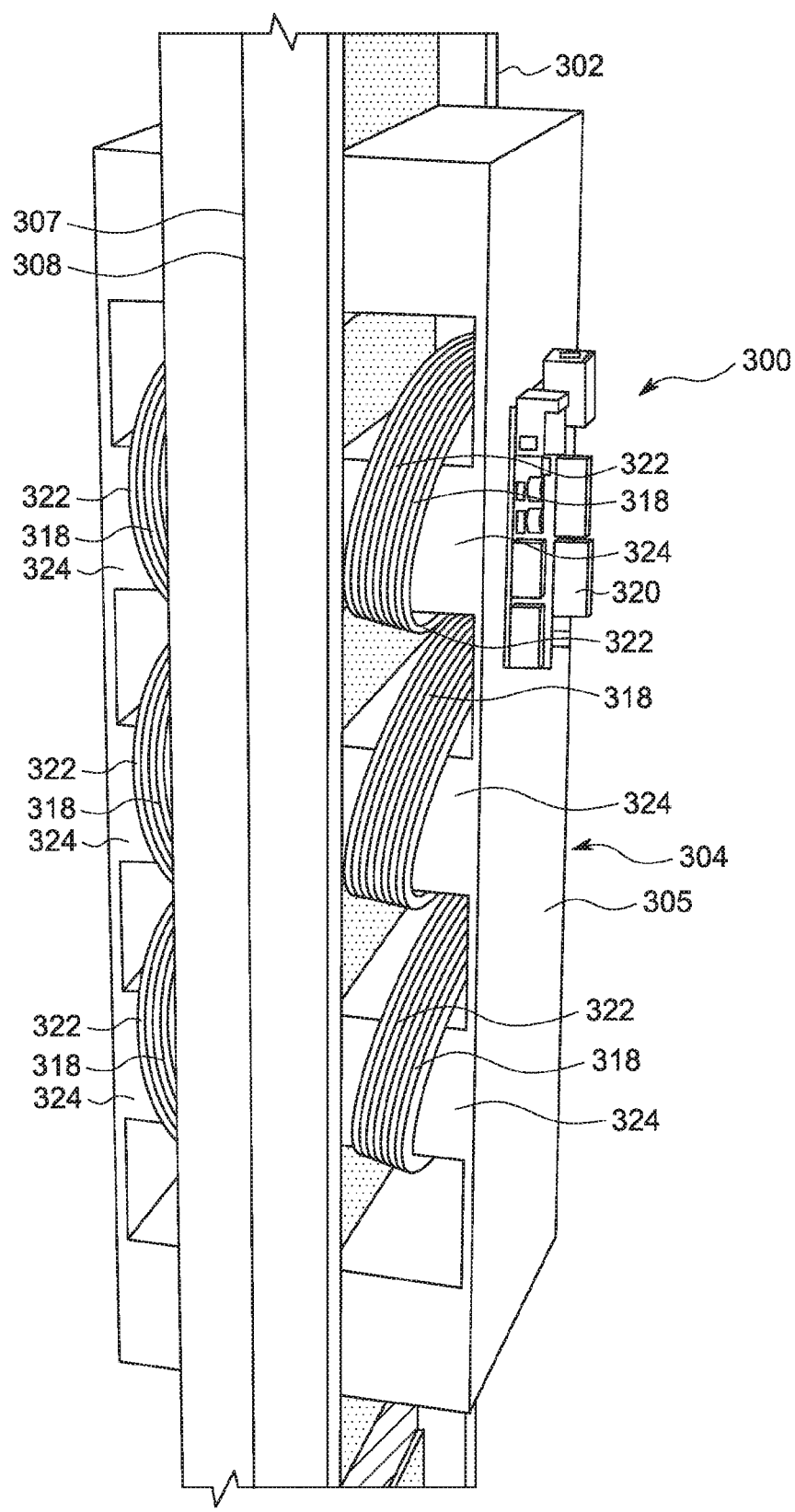
FIG. 12 is a perspective view of the well bore robot conveyance system shown in FIG. 11 without a robot shell.

FIG. 12 is a perspective view of well bore robot conveyance system 300 without shell 305. EM well bore robot 304 includes a magnetic sled 316 which includes a plurality of electromagnets 318 and a control board 320. In the exemplary embodiment, magnetic sled 316 includes three electromagnets 318. However, magnetic sled 316 may include any number of electromagnets 318 which enables EM well bore robot 304 to operate as described herein. Each electromagnet 318 includes a coil 322 and a core 324. In the exemplary embodiment, coils 322 include copper coils. However, coils 322 may include any material which enables EM well bore robot 304 to operate as described herein. In the exemplary embodiment, cores 324 include iron cores. However, cores 324 may include any material which enables EM well bore robot 304 to operate as described herein. Each coil 322 is wrapped around a respective core 324. Each coil 322 is electrically coupled to power line 308. Control board 320 controls the polarity of electromagnets 318.

Energizing and de-energizing or reversing the polarity of electromagnets 318 creates a unique system of magnetic fields (not shown) that convey EM well bore robot 304 along magnetic track element 302. The electric current supplied to power line 308 and electromagnets 318 is constantly alternating to change the polarity of electromagnets 318. This change in polarity causes the magnetic field to pull the EM well bore robot 304 forward. In the exemplary embodiment, the velocity of EM well bore robot 304 is about 100 feet per minute. However, the velocity of EM well bore robot 304 may be any velocity which enables well bore robot conveyance system 300 to operate as described herein.

Figure 13:
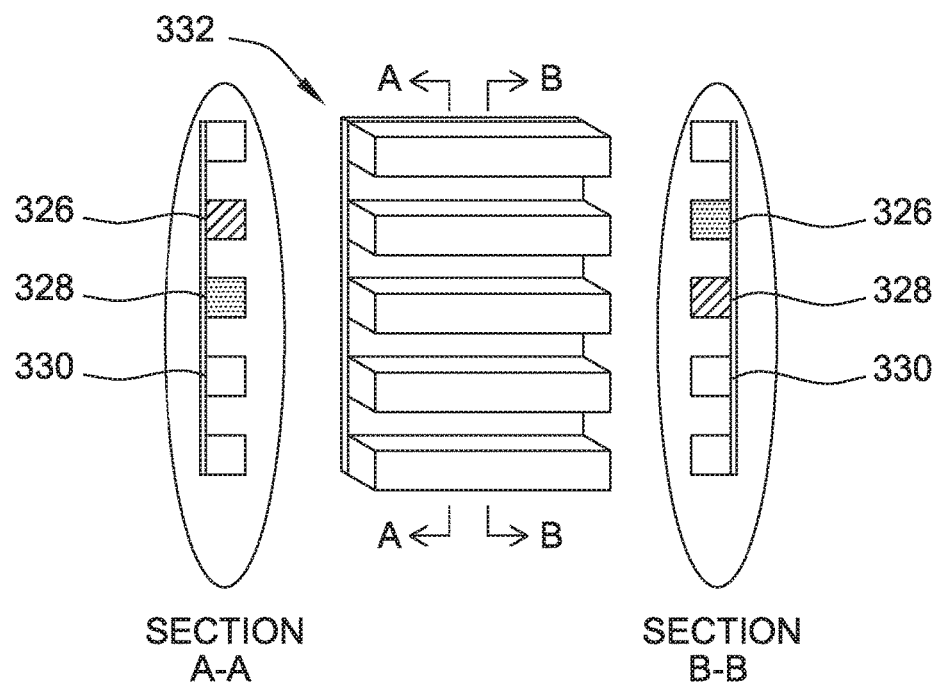
FIG. 13 is a diagram of a first polarity configuration of electromagnets within the well bore robot conveyance system shown in FIG. 11.
Figure 14:
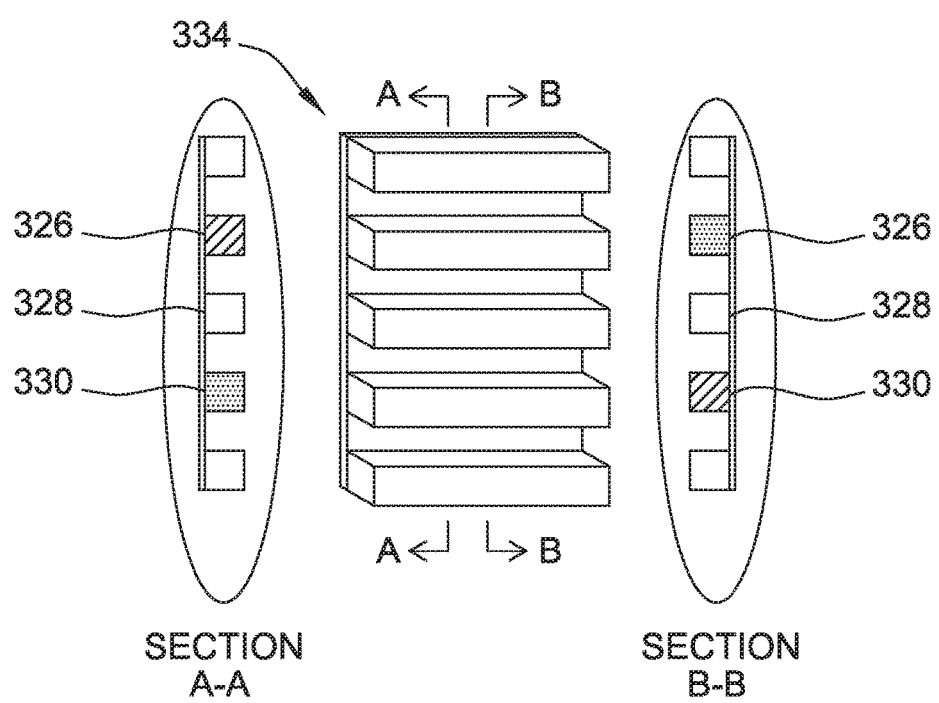
FIG. 14 is a diagram of a second polarity configuration of electromagnets within the well bore robot conveyance system shown in FIG. 11.
Figure 15:
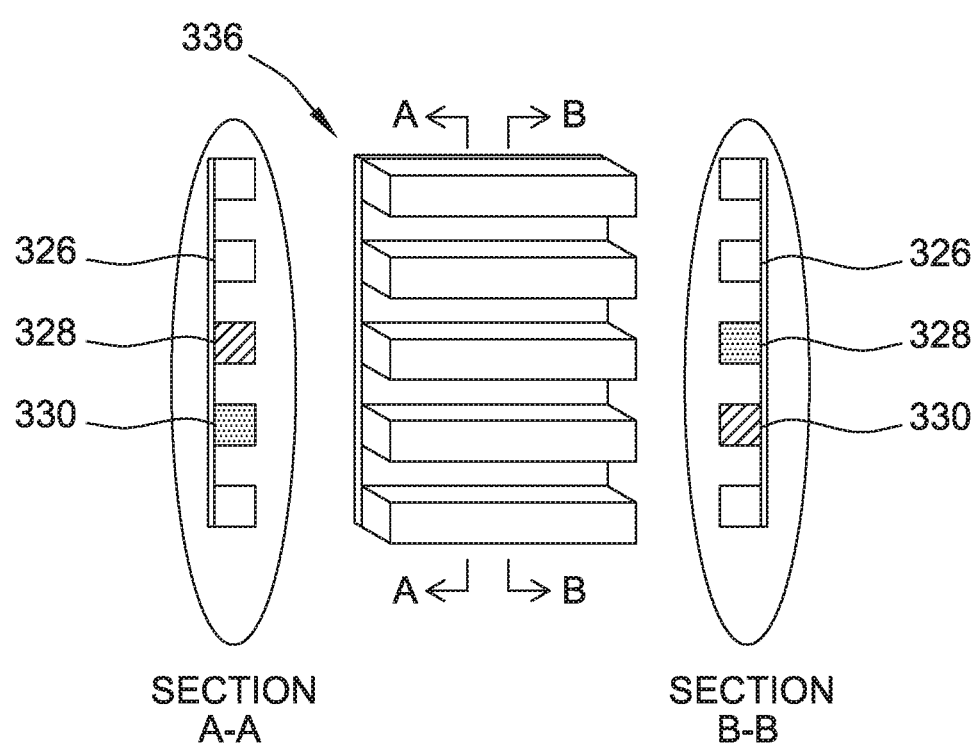
FIG. 15 is a diagram of a third polarity configuration of electromagnets within the well bore robot conveyance system shown in FIG. 11.

FIG. 13 is a perspective view, left side view, and right side view of a first polarity configuration 332 of electromagnets 318 when EM well bore robot 304 travels along magnetic track element 302. Right side view of FIG. 13 is taken along section A-A and left side view of FIG. 13 is taken along section B-B. FIG. 14 is a perspective view, left side view, and right side view of a second polarity configuration 334 of electromagnets 318 when EM well bore robot 304 travels along magnetic track element 302. Right side view of FIG. 14 is taken along section A-A and left side view of FIG. 14 is taken along section B-B. FIG. 15 is a perspective view, left side view, and right side view of a third polarity configuration 336 of electromagnets 318 when EM well bore robot 304 travels along magnetic track element 302. Right side view of FIG. 15 is taken along section A-A and left side view of FIG. 15 is taken along section B-B. In the exemplary embodiment, electromagnets 318 include three electromagnets 326, 328, and 330 and three polarity configurations 332, 334, and 336. In FIGS. 13, 14, and 15, magnetic north polarity is indicated by crosshatching, magnetic south polarity is indicated by dot, and off or no magnetic polarity is indicated by no shading. In first polarity configuration 332 shown in FIG. 13, a first electromagnet 326 is configured with a given north-south polarity configuration, a second electromagnet 328 is configured with an opposite polarity configuration to first electromagnet 326, and a third electromagnet 330 is off with no magnetic polarity. Electromagnets 318 then change to second polarity configuration 334 shown in FIG. 14. In second polarity configuration 334 first electromagnet 326 maintains its polarity arrangement from configuration 332, second electromagnet 328 is off, and a third electromagnet 330 is configured to have opposite polarity to first electromagnet 326. Electromagnets 318 then change to third polarity configuration 336 shown in FIG. 15. In the third polarity configuration 336 the first electromagnet 326 is off, a second electromagnet 328 is configured with the same polarity as electromagnet 326 in previous configuration 334, and a third electromagnet 330 is configured with the opposite polarity arrangement of second electromagnet 328. Finally, the cycle repeats and electromagnets 318 return to first polarity configuration 332 shown in FIG. 13. Alternating the polarity configuration between first, second, and third polarity configurations 332, 334, and 336 causes the magnetic field to convey the EM well bore robot 304 forward along the magnetic track element 302.

Figure 16:
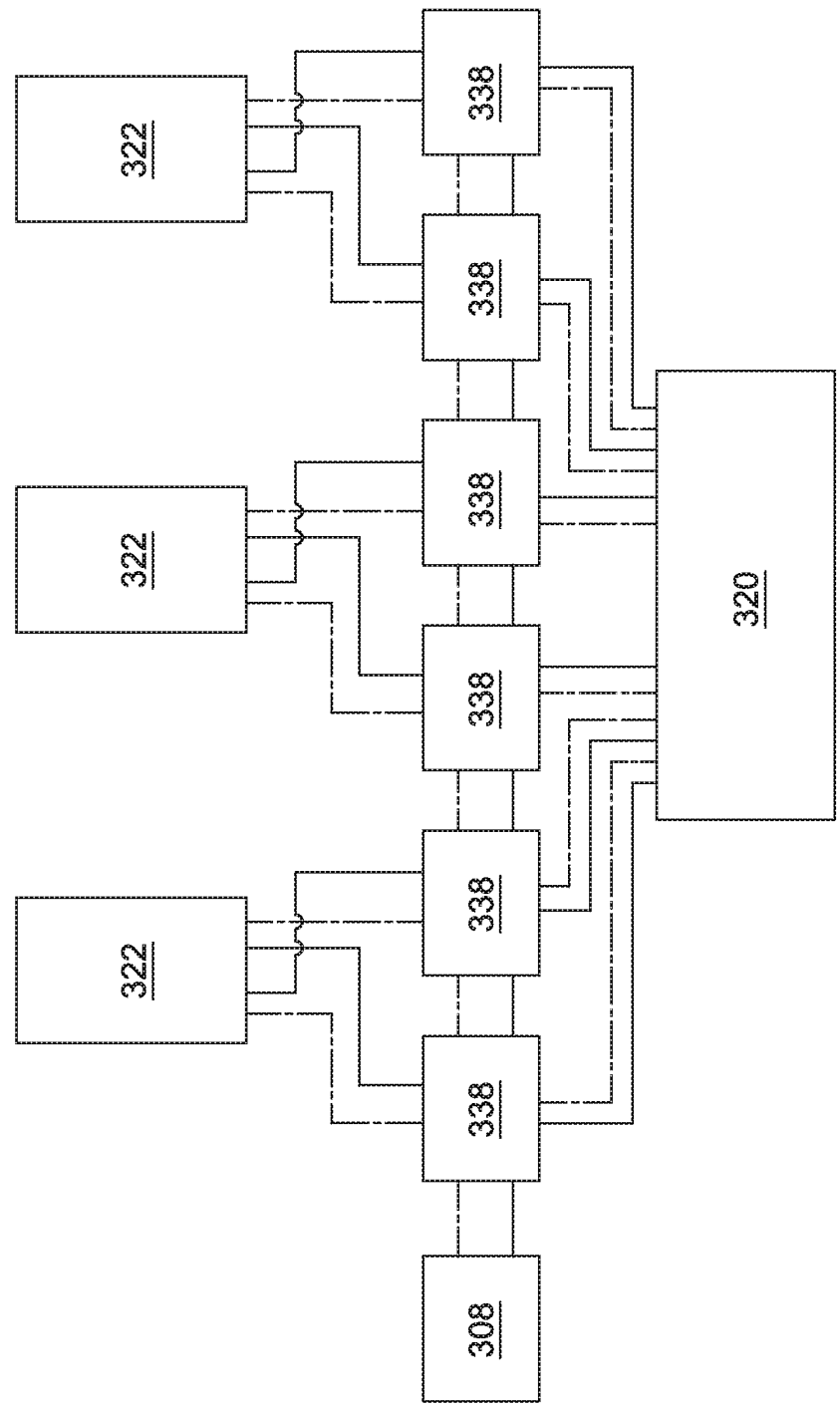
FIG. 16 is an electrical diagram of coils within the well bore robot conveyance system shown in FIG. 11.

FIG. 16 is an electrical diagram of coils 322. EM well bore robot 304 includes a plurality of relays 338. Each relay 338 is electrically coupled to controller 320, a coil 322, and power line 308. Power line 308 provides electrical power to each coil 322 through a respective relay 338. Each coil is electrically coupled to two relays 338. For coil 322 to produce a magnetic field with a given polarity configuration, one of the relays 338 provides current to coil 322. When coil 322 requires an opposite polarity configuration, the other relay 338 reverses the current direction within coil 322. When coil 322 requires no magnetic field, neither relay 338 provides power to coil 322.

Well bore robot conveyance systems 200, 300, and 700 are not limited to obtain measurements in well bores 108. Rather well bore robot conveyance systems 200, 300, and 700 may be used to obtain data on any cavity, such as, but not limited to, sewer drains, pipes, pipes in industrial facilities, air ducts, piping in industrial machines, and any cavity which may require inspection and maintenance.

The above described well bore robot conveyance systems facilitate a faster and more cost effective method of inspecting an oil and gas well. Specifically, the well bore robot conveyance systems convey repair and inspection equipment down an oil and gas well using an electromagnetic track. More specifically, robot devices, which include repair and inspection equipment, are conveyed down the electromagnetic track by controlling the polarity of the electromagnets within either the track or the robot. Sending equipment down an oil and gas well with an electromagnetic track completes well inspections in less time than conventional inspection methods, reduces down time due to inspections, and reduces inspection costs.

An exemplary technical effect of the methods, systems, and assembly described herein includes at least one of: (a) sending a robot device down a cavity with an electromagnetic track; (b) decreasing the intervening time of the cavity; (c) reducing the downtime of equipment including cavities; and (d) reducing the cost of an inspection of equipment including cavities.

Exemplary embodiments of methods, systems, and apparatus for electromagnetic well bore robot conveyance systems are not limited to the specific embodiments described herein, but rather, components of systems and/or steps of the methods may be utilized independently and separately from other components and/or steps described herein. For example, the methods, systems, and apparatus may also be used in combination with other systems having cavities such as pipes and sewers, and the associated methods, and are not limited to practice with only the systems and methods as described herein. Rather, the exemplary embodiment can be implemented and utilized in connection with many other applications, equipment, and systems that may benefit from cavity inspection and repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A well bore robot conveyance system comprising:
a magnetic track element comprising a plurality of track magnets, at least one power transfer line configured to energize and de-energize said plurality of electromagnets, a latch configured to cease conveyance of said well bore robot at a predetermined location, and at least one data transfer line configured to receive data transferred from said at least one data transfer brush;
a well bore robot comprising a robot body, at least one robot magnet with a constantly alternating polarity disposed within said robot body, said at least one robot magnet configured to magnetically and alternatingly engage and disengage with said plurality of track magnets, wherein alternating engagement and disengagement of said at least one track magnet with said plurality of track magnets conveys said well bore robot along said magnetic track element, and at least one data transfer brush disposed within said robot body, said at least one data transfer brush configured to transfer data collected by said well bore robot; and a power source, said power source and said at least one power transfer line are configured to energize and de-energize said plurality of electromagnets, wherein said latch comprises at least one cantilever configured in an open position when said power source and said at least one power transfer line are not coupled in electrical communication with said plurality of electromagnets.

2. The well bore robot conveyance system in accordance with claim 1, wherein said latch comprises at least one cantilever configured in a closed position when said power source and said at least one power transfer line are coupled in electrical communication with said plurality of electromagnets.

3. The well bore robot conveyance system in accordance with claim 2 wherein said well bore robot further comprises at least one brush positioned on an outer surface of said robot body, said at least one brush configured to clean a well.

4. The well bore robot conveyance system in accordance with claim 1, wherein said well bore robot further comprises at least one data collection module disposed within said robot body, said at least one data collection module configured to collect data.

5. The well bore robot conveyance system in accordance with claim 4, wherein said well bore robot further comprises at least one data storage module disposed within said robot body and coupled in data transfer communication with said at least one data collection module, said at least one data storage module configured to store data collected by said at least one data collection module.

6. The well bore robot conveyance system in accordance with claim 5, wherein said well bore robot further comprises at least one battery disposed within said robot body, said at least one battery configured to power said at least one data collection module and said at least one data storage module.

7. The well bore robot conveyance system in accordance with claim 6, wherein said well bore robot further comprises at least one control unit, said at least one control unit comprises at least one of a chip, an integrated circuit, or a plurality of electronic circuits configured to process data, said at least one control unit configured to control at least one of said least one data collection module, said at least one data storage module, said at least one data transfer brush, or said at least one battery.

8. The well bore robot conveyance system in accordance with claim 1, wherein said well bore robot further comprises at least one wheel coupled to said robot body, said at least one wheel configured to convey said well bore robot along the magnetic track element.

9. The well bore robot conveyance system in accordance with claim 1, wherein said well bore robot further comprises at least one retrieval flap, said at least one retrieval flap configured to assist the plurality of track magnets and at least one robot magnet to convey said well bore robot in a first direction along the magnetic track element.

10. The well bore robot conveyance system in accordance with claim 1, wherein said robot body defines at least one of a spherical shape, a cylindrical shape, a capsule shape, a cubical shape or an annular shape.

11. The well bore robot conveyance system in accordance with claim 1, wherein said magnetic track element further comprises a computer configured to receive data transferred from said at least one data transfer line.

12. The well bore robot conveyance system in accordance with claim 1, wherein said robot magnet comprises an electromagnet and said plurality of track magnets comprises a plurality of permanent magnets.

* * * * *